(12) United States Patent  
Volach

(10) Patent No.: US 9,749,284 B2
(45) Date of Patent: Aug. 29, 2017

(54) SYSTEMS AND METHODS OF CONTROLLED RECIPROCATING COMMUNICATION

(71) Applicant: PECAN TECHNOLOGIES INC., Tortola (VG)

(72) Inventor: Ben Volach, Haifa (IL)

(73) Assignee: PECAN TECHNOLOGIES INC., Tortola (VG)

( * ) Notice: Subject to any disclaimer, the term of this patent is extended or adjusted under 35 U.S.C. 154(b) by 0 days.

(21) Appl. No.: 14/890,986

(22) PCT Filed: May 12, 2014

(86) PCT No.: PCT/IB2014/061375
§ 371 (c)(1),
(2) Date: Nov. 13, 2015

(87) PCT Pub. No.: WO2014/184724
PCT Pub. Date: Nov. 20, 2014

(65) Prior Publication Data
US 2016/0112368 A1    Apr. 21, 2016

Related U.S. Application Data

(60) Provisional application No. 61/822,716, filed on May 13, 2013.

(51) Int. Cl.
*H04L 29/12* (2006.01)
*H04W 4/08* (2009.01)
(Continued)

(52) U.S. Cl.
CPC ........ *H04L 61/10* (2013.01); *H04M 3/42008* (2013.01); *H04W 4/08* (2013.01); *H04W 4/206* (2013.01); *H04L 61/1594* (2013.01)

(58) Field of Classification Search
CPC .... H04L 51/043; H04L 67/24; G06Q 30/0243
See application file for complete search history.

(56) References Cited

U.S. PATENT DOCUMENTS 7,356,567 B2 * 4/2008 Odell .................. G06Q 10/107
709/206
7,706,371 B1 * 4/2010 Wing ..................... H04L 12/56
370/392

(Continued)

*Primary Examiner* — Jimmy H Tran
(74) *Attorney, Agent, or Firm* — Mark David Torche; Patwrite LLC

(57) ABSTRACT

Systems and method for controlled pre-interaction are disclosed. The method of performing controlled pre-interaction includes: providing at least one private interaction address, defining at least one manageable public interaction address, forming a record of manageable public interaction address associated with the private interaction address. The method of performing controlled pre-interaction further includes: generating a reverse list, wherein an interaction address of a participant is associated at least with the manageable public interaction address, and performing at least one pre-interaction act. A pre-interaction act includes: accessing the reverse list, identifying the interaction address of the participant in the reverse list, and determining that the manageable public interaction address is associated, at the reverse list, with the interaction address of the participant.

38 Claims, 4 Drawing Sheets

(51) Int. Cl.
*H04W 4/20* (2009.01)
*H04M 3/42* (2006.01)

(56) References Cited

U.S. PATENT DOCUMENTS

| | | | | |
|---|---|---|---|---|
| 7,895,263 B1* | 2/2011 | Kirchmeier | ............ | G06Q 10/06 |
| | | | | 379/37 |
| 7,954,124 B2* | 5/2011 | Rambo | ................ | H04L 12/581 |
| | | | | 725/40 |
| 7,995,730 B1* | 8/2011 | Zhang | ............... | H04M 3/42059 |
| | | | | 379/142.09 |
| 8,259,571 B1* | 9/2012 | Raphel | ................ | H04L 61/2592 |
| | | | | 370/230 |
| 8,701,179 B1* | 4/2014 | Penno | ..................... | H04L 63/02 |
| | | | | 709/227 |
| 8,918,466 B2* | 12/2014 | Yu | ........................... | H04L 51/28 |
| | | | | 709/206 |
| 2002/0046299 A1* | 4/2002 | Lefeber | ................... | H04L 29/06 |
| | | | | 719/318 |
| 2003/0081753 A1 | 5/2003 | Trandal | | |
| 2003/0217109 A1* | 11/2003 | Ordille | ................. | G06Q 10/00 |
| | | | | 709/206 |
| 2003/0233454 A1 | 12/2003 | Alkhatib | | |
| 2004/0190703 A1* | 9/2004 | Trandal | ............... | H04M 3/42195 |
| | | | | 379/210.01 |
| 2004/0249911 A1* | 12/2004 | Alkhatib | .............. | G06Q 10/109 |
| | | | | 709/223 |
| 2005/0135359 A1* | 6/2005 | Chang | ............... | H04L 29/12009 |
| | | | | 370/389 |
| 2006/0227792 A1* | 10/2006 | Wetterwald | ....... | H04L 29/12358 |
| | | | | 370/395.52 |
| 2006/0233351 A1* | 10/2006 | Oshika | ............. | H04M 3/42008 |
| | | | | 379/355.02 |
| 2008/0101357 A1* | 5/2008 | Iovanna | ............ | H04L 29/12009 |
| | | | | 370/389 |
| 2008/0267186 A1* | 10/2008 | Boukis | .............. | H04L 29/12367 |
| | | | | 370/392 |
| 2009/0086932 A1* | 4/2009 | Ray | ..................... | H04W 76/007 |
| | | | | 379/45 |
| 2009/0165090 A1* | 6/2009 | Glasgow | ........... | G06F 17/30525 |
| | | | | 726/3 |
| 2011/0055374 A1* | 3/2011 | Christenson | ...... | H04L 29/12066 |
| | | | | 709/224 |
| 2013/0051542 A1* | 2/2013 | Yao | .................... | H04M 3/42042 |
| | | | | 379/142.09 |
| 2013/0204997 A1* | 8/2013 | Eggleston | ........... | H04L 41/5009 |
| | | | | 709/223 |
| 2013/0301522 A1* | 11/2013 | Krishna | .............. | H04L 61/2528 |
| | | | | 370/328 |
| 2013/0318173 A1* | 11/2013 | Kaplinger | ............. | H04L 61/301 |
| | | | | 709/206 |
| 2013/0326599 A1* | 12/2013 | Bray | ................... | H04L 61/1511 |
| | | | | 726/6 |
| 2014/0065997 A1* | 3/2014 | Walker | .................... | H04W 4/02 |
| | | | | 455/404.1 |

* cited by examiner

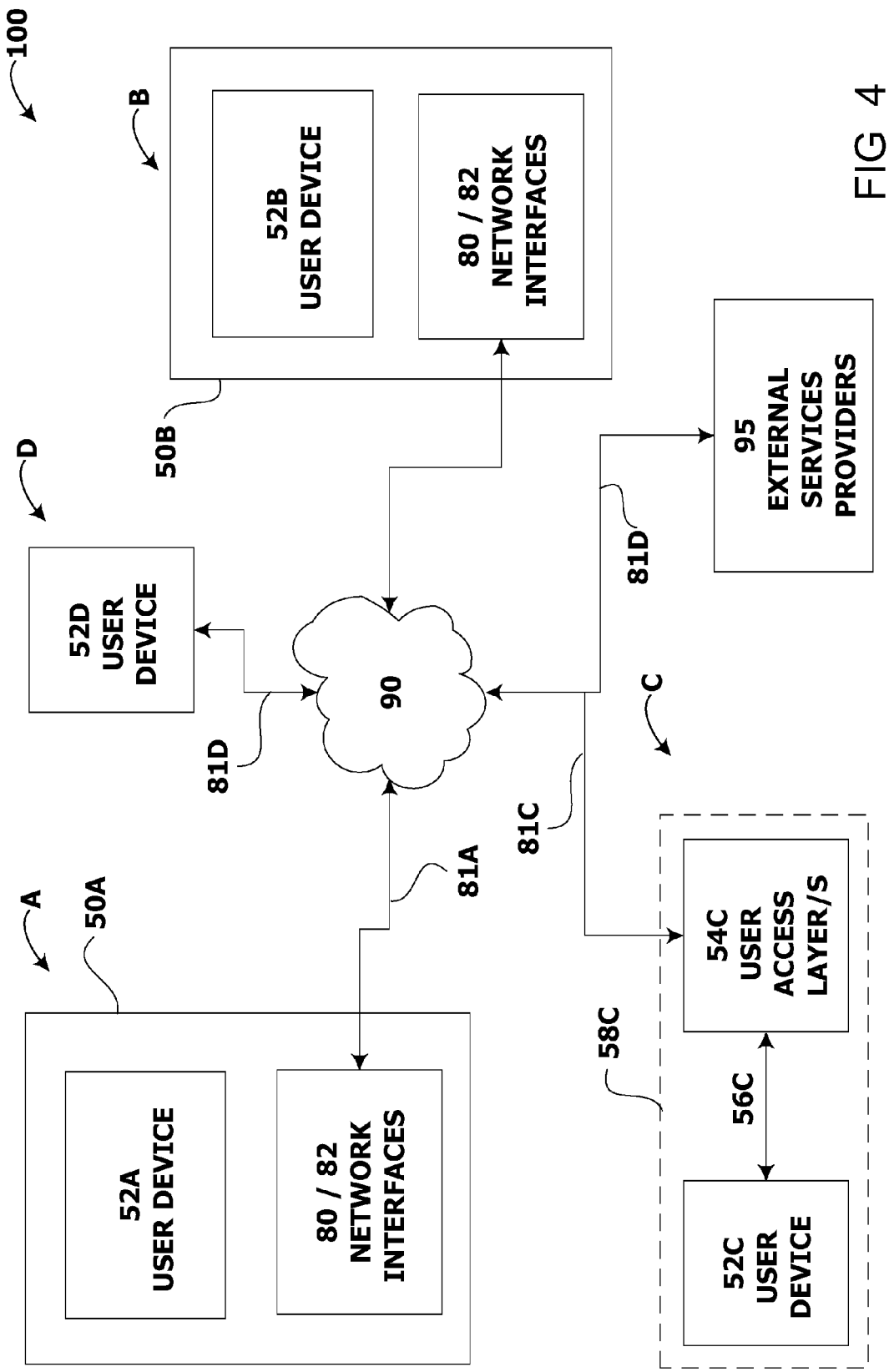

SYSTEMS AND METHODS OF CONTROLLED RECIPROCATING COMMUNICATION

CROSS-REFERENCE TO RELATED APPLICATIONS

This application is national phase of international application PCT/1132014/061375, filed 12 May 2013. This application claims priority from U.S. provisional application 61/656,020 filed 13 May 2012, the contents of which are incorporated herein by reference.

TECHNICAL FIELD

In general, the present invention pertains to the arts of telecommunications and/or computer networking. In particular, the invention relates to systems and methods of controlled reciprocating communication as well as systems and methods of controlled pre-interaction.

BACKGROUND ART

It is believed that the pertinent state-of-the-art is represented by the following patent literature: U.S. Pat. No. 7,995,730, U.S. Pat. No. 7,436,943 and U.S. Pat. No. 7,602,894; US patent application Ser. No. US2010/054444 and US2012/328089; GB patent application Ser. No. GB2454886; European patent application Ser. No. EP2073521 and EP2448227 as well as by international patent applications having Publication No. WO2007/053768 and WO2010/135000.

It is believed that the pertinent state-of-the-art is represented by the following non-patent literature: Requests for Comments 3261 and 5627; Technical Specification of 3rd Generation Partnership Project—3GPP TS 23.228 V12.0.0 (2013-03); Session Initiation Protocol (SIP) and Session Initiation Protocol for Instant Messaging (SIMPLE) standards collection.

DEFINITIONS

The term non-transitory computer readable media communication, as referred to herein, is to be construed to include all computer-readable media, with the sole exception being a transitory propagating signal per se.

The term communication, as referred to herein, is to be construed as any type of electronic communication, having an identifiable opponent and/or participant. Thus physical communications by couriers and types of electronic radio or television broadcasting, with unidentifiable watchers, are typically not within the scope of the term communication. Additionally, an attempted or incomplete communication, such as rejected telephone call or bounced email, is to be construed as communication. Instances of various types of communication inter alia include: a line telephone communication, line facsimile communication, cellular/mobile phone communication, short message service (SMS) communication, multimedia messaging service (MMS) communication, multimedia session, instant messaging (IM) communication, electronic mail (e-mail) communication, presence communication, personal message or private message (PM), voice over IP (VoIP) communication, video chatting communication, audio and/or video conferencing communication, file transfer and media sharing communication as well as any other communication by sharing.

The term interaction address, as referred to herein, is to be construed as any string of alphanumeric and/or other characters, which is uniquely associated to a party of communication. Instances of interaction address inter alia include: a line telephone number, line facsimile number, cellular/mobile phone number, IM contact or screen name, e-mail address, presence screen name or contact name, user service handle (e.g. Facebook or Twitter ID), Universal Resource Identifier (URI), Universal Resource Name (URN), Universal Resource Locator (URL), Extensive Resource Identifier (XRI), SIP URI, and any other type of user identifier for sharing or communication.

The term interaction address, as referred to herein, is to be construed as including a partial interaction address, namely any portion of the string of alphanumeric and/or other characters or a sub-string thereof. Particularly, an interaction address is optionally defined as including a sub-string of wildcards, typically representing a group of people having identical portions in their interaction addresses, such as coworkers in the same organization.

The term private interaction address, as referred to herein, is to be construed as an interaction address which the user wishes to controllably expose to participants; whereas public interaction address is to be construed as an interaction address which the user may distribute or publish, even uncontrollably.

The term controlled communication, as referred to herein, is to be construed as a communication performed from a particular selectable public interaction address, wherein the participant is exposed upon aforesaid communication merely to aforesaid selectable public interaction address.

The term controlled pre-interaction, as referred to herein, is to be construed as determining the particular selectable public interaction address associated with an interaction address of a participant. Controlled pre-interaction is optionally performed upon browsing, inspecting, accessing, searching, looking for friends, synchronizing contacts, viewing a profile and/or content on a presence network, such as a social or professional computer network (e.g. Facebook or Linkedin).

A reverse list, as referred to herein, is to be construed as including at least one reverse list entry. The reverse list entry is defined as any entry in a database, row and/or column in a table or any other type of record for this matter, listing at least one interaction address of a participant alongside a public interaction address of the user, as well as association therebetween.

Whenever the terms: system, module, agent or server are used herein, they should be construed as a computer program, including any portion or alternative thereof, e.g. script, command, etc., and/or a hardware component's, including configurations or assemblies thereof, such as computer storage medium, computer micro-processor, operative memory, graphical user interface (GUI), input devices and networking terminals, as well as any combination of the former with the latter.

The term integrated shall be inter alia construed as—operable on the same machine and/or executed by the same computer program. Depending on the actual deployment of the method, its implementation and topology, integration of agents and/or integration into modules as well as the terms "transfer", "relaying", "transmitting", "forwarding", "retrieving", "accessing", "pushed" or similar refer to any interaction between agents via methods inter alia including: function calling, API (Application Programming Interface), IPC (Inter-Process Communication), RPC (Remote procedure call) and/or communicating using of any standard or proprietary protocol, such as SMTP, IMAP, POP, MAPI, OMA, SIP/SIMPLE, XMPP, SMPP, IMS, SOAP/Rest, XML/RPC, web services.

Legacy and/or telephony network, as referred to herein, should be understood as any type of telephony system and particularly telephony systems compliant with standards know in the art as: POTS and PSTN.

SIP—Session Initiation Protocol as referred to herein includes: RFC 3261.

SIMPLE—Session Initiation Protocol for Instant Messaging and Presence standards collection as referred to herein includes: RFC 3428, RFC 3856, RFC 3857, RFC 3858 and RFC 4825.

It should be understood, however, that the particular definitions supra are not to limit the invention to the particular forms and examples, but on the contrary, is to cover all modifications, equivalents, and alternatives falling within the scope of the invention.

DESCRIPTION OF THE DRAWINGS

The present invention will be understood and appreciated more comprehensively from the following detailed description taken in conjunction with the appended drawings in which:

FIG. 4 is a schematic diagram of an embodiment of the system for controlled pre-interaction, involving multiple and different parties.

Figure 1:
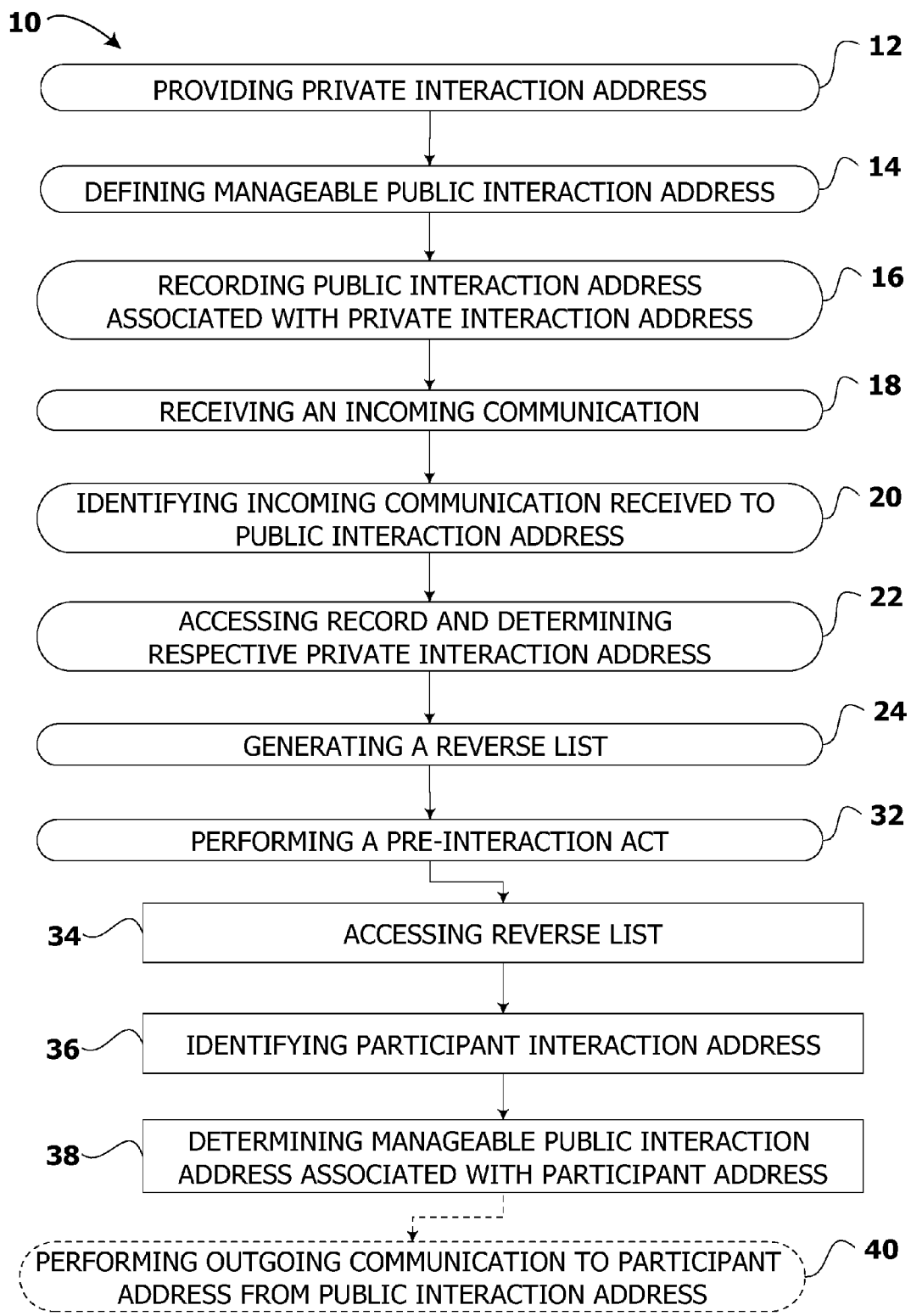
FIG. 1 is a high-level flowchart of an embodiment of the method of performing controlled reciprocating communication, in accordance with one aspect of the present invention.

While the invention is susceptible to various modifications and alternative forms, specific embodiments thereof have been shown merely by way of example in the drawings. The drawings are not necessarily complete, whereas emphasis instead was placed upon clearly illustrating the principles underlying the present invention.

DETAILED DISCLOSURE OF EMBODIMENTS

Illustrative embodiments of the invention are described below. In the interest of clarity, not all features of actual implementation are described in this specification. It will of course be appreciated that in the development of any such actual embodiment, numerous implementation-specific decisions must be made to achieve the developers' specific goals, such as compliance with technology- or business-related constraints, which may vary from one implementation to another. Moreover, it will be appreciated that the effort of such a development might be complex and time-consuming, but would nevertheless be a routine undertaking for those of ordinary skill in the art having the benefit of this disclosure.

In accordance with some embodiments of the present invention, reference is now made to FIG. 1, showing a high-level flowchart of method 10 for controlled reciprocating communication. Method 10 of controlled reciprocating communication commences on step 12, with providing at least one private interaction address. It should be acknowledged that more than one private interaction address is optionally provided at step 12.

It should be further acknowledged that a plurality of private interaction addresses of different types is optionally provided at step 12; thus a telephone number and e-mail address can be concomitantly provided at step 12. Moreover updating, adding, replacing, altering or editing at least one additional or alternative private interaction address, of the same type and/or different types, any time thereafter, constitutes an iterative execution of step 12 and shall be considered as the providing of at least one private interaction address.

At step 14, at least one manageable public interaction address is defined in the system of the present invention. Aforesaid at least one manageable public interaction address is a non-limiting manner defined by: a user of the system of the present invention, an operator or administrator of the system of the present invention and/or a third party, such as external services providers.

It should be acknowledged that more than one manageable public interaction address, of the same type, is optionally defined at step 14; such as more than one e-mail address. It should be further acknowledged that a plurality of manageable public interaction addresses of different types is optionally defined at step 14; thus a public telephone number and public e-mail address can be concomitantly defined at step 14. Moreover updating, adding, replacing, altering and/or editing at least one additional or alternative manageable public interaction address, of the same type and/or different types, any time thereafter, constitutes an iterative execution of step 14 and shall be considered as the defining of at least one manageable public interaction address.

Subsequently, at step 16, at least one private interaction address, provided at step 12, is associated with at least one manageable public interaction address, defined at step 14. The association of the private interaction address with the manageable public interaction address is recorded at step 16. Aforesaid association of a private interaction address with a manageable public interaction address and recordal thereof, at step 16, is a non-limiting manner performed by: a user of the system of the present invention, an operator of the system of the present invention and/or a third party, such as external services providers.

It should be acknowledged that more than one manageable public interaction address is optionally associated, at step 16, with a single private interaction address and hence a plurality of associations of the same private interaction address with several different manageable public interaction addresses is optionally recorded at step 16. It should be further acknowledged that a plurality of manageable public interaction addresses of different types is optionally associated at step 16 with a single private interaction address. Thus for instance a public telephone number and public e-mail address can be concomitantly associated at step 16 to a single private telephone number and hence two respective associations, namely public telephone number with private telephone number and public e-mail address with private telephone number, are recorded at step 16. Furthermore updating, adding, replacing, altering and/or editing at least one additional or alternative association of a manageable public interaction address with a private interaction address, any time thereafter, constitutes an iterative execution of step 16 and shall be considered as the associating at least one manageable public interaction address to a private interaction address and recording such association. Moreover associating a manageable public interaction address to a plurality of private interaction address constitutes an iterative execution of step 16 and shall be considered as the associating at least one manageable public interaction address to a private interaction address and recording such association.

Each public interaction address is typically subjected to management. Management events of public interaction address in a non-exhaustive manner are selected from: revoking public interaction address, renaming public interaction address, unrevoking public interaction address, suspending public interaction address for a predefined period of time, assigning public interaction address to a certain public profile, unassigning public interaction address off a certain public profile, renaming of or assigning/unassigning metadata to/off public interaction address, defining a rule for notification and/or content thereof, as well as arranging public interaction addresses for view or access, per private communication address, certain public profile or any other parameter for that matter, as elaborated hereunder.

The revoking of a given public interaction address, inter alia, comprises permanently deleting or temporally deactivating for indefinite period of time aforesaid given public interaction address from/at the record of public addresses, formed at step 16; closing an account of aforesaid given public interaction address, defined at step 16, as well as permanently deleting or temporally deactivating for indefinite period of time an association of aforesaid given public interaction address to the respective private interaction address, recorded at step 16.

The unrevoking of a given public interaction address, inter alia, comprises reactivating aforesaid given public interaction address at the record of public addresses, formed at step 16; reopening an account of aforesaid given public interaction address, defined at step 16, as well as reactivating an association of aforesaid given public interaction address to the respective private interaction address, recorded at step 16.

The suspending of a given public interaction address comprises revoking aforesaid given public interaction address, as set forth hereinabove, followed by unrevoking aforesaid given public interaction address, after a predefined period of time and/or completion of predefined unrevoking event; suspending an account of aforesaid given public interaction address, as well as suspending an association of aforesaid given public communication to the respective private interaction address, recorded at step 16.

The renaming of a given public interaction address and/or editing metadata thereof, inter alia, comprises assigning a name and/or metadata to aforesaid given public interaction address at the record of public addresses, recorded at step 16, deleting, altering or editing a name and/or metadata assigned to aforesaid given public interaction address at the record of public addresses, recorded at step 16, as well as assigning a name and/or metadata to an association of aforesaid given public communication to a private interaction address, recorded at step 16.

The assigning public interaction address to a certain public profile, inter alia, comprises defining a public profile, associating at least one public interaction address the certain public profile and recording the association of aforesaid at least one public interaction address with the certain public profile. The public profiles and/or association thereof with public interaction address/addresses are optionally recorded at the record of public addresses, formed at step 16; however in some embodiments public profiles and/or association thereof with public interaction address/addresses are recorded in a dedicated record, other than the record of public addresses, formed at step 16. The assigning public interaction address to a certain public profile, optionally, further comprises unassigning/reassigning public interaction address off/to the certain public profile, as well as deleting, altering or editing the definition of public profiles and/or association thereof with public interaction address/addresses at the record of public addresses, formed at step 16 and/or the aforesaid dedicated record, other than the record of public addresses, formed at step 16.

Defining a rule for notification and/or content of notification, as elaborated infra, comprises defining at least one rule for notification and/or content of notification, associating the aforementioned rule for notification and/or content thereof with a public interaction address and/or certain public profile and recording the association of aforesaid rule for notification and/or content thereof with a public interaction address or a certain public profile.

It should be acknowledged that aforementioned exemplary management events, for public interaction address/addresses, are optionally performed during step 16; however some or all of aforementioned exemplary management events are optionally performed at a dedicated step (not shown), of managing public interaction address/addresses.

At some time point, additionally to associating a manageable public interaction address with a private interaction address and recordal of the association thereof, performed at step 16, as well optionally to managing the public interaction address, as set forth supra, an incoming communication is typically received by the system of controlled reciprocating communication, at step 18. It is emphasized that despite the fact that step 18, of receiving an incoming communication is shown in flowchart 10 as following step 16, of associating a manageable public interaction address with a private interaction address and recordal of the association thereof, in various implementations of the method of performing controlled reciprocating communication, shown in flowchart 10, step 18 of receiving an incoming communication precedes step 16, of associating a manageable public interaction address and recordal of the association thereof. Moreover, it should be noted, that an attempted incoming communication, e.g. rejected telephone call or bounced email, constitutes receiving an incoming communication of step 18.

Upon receiving an incoming and/or attempted incoming communication, at step 18, the system of controlled reciprocating communication identifies that the incoming and/or attempted incoming communication was received to a given manageable public interaction address, at step 20.

Thereafter, upon identifying that the incoming and/or attempted incoming communication was received to a given manageable public interaction address, performed at step 20, the system of controlled reciprocating communication accesses the record of public addresses, formed at step 16, and determines the respective private interaction address/addresses, based on the association thereof with the manageable public interaction address, as recorded at step 16, to which the incoming and/or attempted incoming communication was received, during step 22.

Subsequently to determining the respective private interaction address/addresses, based on the association thereof with the manageable public interaction address, as recorded at step 16, to which the incoming and/or attempted incoming communication was received, during step 22, the system of controlled reciprocating communication, optionally, in a non-limiting manner performs at least one from the following (not shown).

The system of controlled reciprocating communication optionally forwards the incoming communication and/or information regarding an attempted incoming communication to the respective private interaction address/addresses associated with the manageable public interaction address, as recorded at step 16, to which the incoming and/or attempted incoming communication was received, during step 22.

Alternatively or additionally the system of controlled reciprocating communication retrieves/presents the manageable public interaction address to which the incoming and/or attempted incoming communication was received, during step 22 and/or retrieving/presenting name, metadata and/or certain public identity assigned the manageable public interaction address to which the incoming and/or attempted incoming communication was received, during step 22.

Alternatively or additionally the system of controlled reciprocating communication applies a notification rule to the incoming communication and/or information regarding an attempted incoming communication, as well as optionally selects the content of the aforementioned notification.

Then, upon completion of steps 12, 14 and 16 the system for controlled reciprocating communication, generates at least one reverse list entry, at step 24. A reverse list entry comprises at least one interaction address of a participant and at least one manageable public interaction address of the user of the system of the present invention. Alongside at least one interaction address of a participant and at least one manageable public interaction address of the user a reverse list entry, optionally, in a non-limiting comprises: a certain public identity assigned to the manageable public interaction address, name and/or metadata assigned to the manageable public interaction address, a rule relating to a notification and/or content thereof, a default communication preference and/or overruling alternative for the default communication preference, as well as personal information and/or contact information of participant. Updating, adding, replacing, altering and/or editing at least one additional or alternative constituent of a reverse list entry, any time thereafter, constitutes an iterative execution of step 24 and shall be considered as the generating at least one reverse list entry. Typically generating at least one reverse list entry includes accessing the reverse list and searching for similar/identical reverse list entry, prior to generating a new reverse list entry.

The generating of aforementioned constituents of a reverse list entry, at step 24, is a non-limiting manner performed by: a user of the system for controlled reciprocating communication, an operator of the system for controlled reciprocating communication and/or a third party, such as external services providers. A reverse list entry is preferably generated upon availability of the interaction address of a participant or some time subsequently to availability of the interaction address of a participant. However in some embodiments an incomplete reverse list entry is generated without the interaction address of a participant, pending the completion of the incomplete reverse list entry upon availability the interaction address of the participant. There are several preferable events and/or triggers for generating a reverse list entry, as detailed hereinafter.

Optionally a reverse list entry is generated, at step 24, manually by inputting the interaction address of the participant as well as optionally personal information and/or contact information of the participant, typically by the user, and optionally without any controlled reciprocating communication following thereafter.

Alternatively or additionally a reverse list entry is optionally generated upon receiving an incoming communication, at step 18. Upon receiving an incoming communication, at step 18, the system for controlled reciprocating communication identifies the interaction address of the participant and records the interaction address of the participant in a newly formed reverse list entry, alongside manageable public interaction address of the user and other optional constituents of reverse list entry. The process of generating a reverse list entry is typically performed either automatically by the system of the invention upon receiving an incoming communication and/or an attempted incoming communication or by prompting the user with proposed details of reverse list entry and upon confirmation of the user to form such an entry.

In some examples, such as with incoming telephone calls from undisclosed number, the interaction address of the participant, namely the telephone number of the calling person, is not available to the user but rather is known merely to the telephony switchboard facility. Therefore in such cases the interaction address of the participant, namely the telephone number of the calling person, is obtained from the telephony switchboard facility and inputted into the reverse list entry by the system for controlled pre-interaction, so that reverse list entry remains confidential to the user. The user in such case will still be able to perform an outgoing communication to the interaction address of the participant, namely the telephone number of the participant, without knowing the telephone number of the participant.

Alternatively or additionally a reverse list entry is optionally generated upon performing an outgoing communication and/or an attempted outgoing communication, at step 40. Upon performing an outgoing communication, at step 40, the system for controlled reciprocating communication identifies the interaction address of the participant and records the interaction address of the participant in a newly formed reverse list entry, alongside manageable public interaction address of the user and other optional constituents of reverse list entry. The process of generating a reverse list entry, upon outgoing communication, is typically performed either automatically by the system of the invention upon identifying the manageable public interaction address from which the participant was contacted or by prompting the user with proposed manageable public interaction address and/or certain public identity to be associated with interaction address of the participant in the proposed reverse list entry and upon confirmation of the user to form such an entry.

Alternatively or additionally a reverse list entry is optionally generated without performing any communication at all, by an operator or administrator of the system of the present invention and/or a third party, such as external services providers. The system for controlled reciprocating communication and/or a third party, such as external services providers, may identify that participant is connected or linked to a certain public profile of the user, for instance in a social or business network. The system for controlled reciprocating communication and/or a third party, such as external services providers, then obtains the interaction address of the participant, by retrieving from the exemplary social or business network data including the interaction address of the participant and by synchronizing these data with the reverse list. The user then may opt to use the interaction address of the participant at the reverse list, to contact the participant or perform a pre-interaction, some time thereafter or not to use the interaction address of the participant at the reverse list.

Subsequently to generating at least one reverse list entry, at step 24, the system for controlled reciprocating communication performs a pre-interaction act, at step 32. An exemplary pre-interaction act, performed at step 32, comprises sub-step 34 of accessing reverse list. Pre-interaction act, performed at step 32, further comprises sub-step 36 of identifying the interaction address of the participant in the reverse list. Ultimately pre-interaction act, performed at step 32, includes sub-step 38 of determining the manageable public interaction address of the user, associated with the given interaction address of the participant in the reverse list. For the sake of clarity it is noted that a pre-interaction, performed at step 32, is not necessarily followed by a communication. Accordingly in some embodiments the system of the present invention performs merely a pre-interaction, as explained in a more detail infra.

Upon performing a pre-interaction act, at step 32 and consequently determining the manageable public interaction address of the user, associated with the given interaction address of the participant in the reverse list, the system for controlled reciprocating communication is capable of and optionally performs an outgoing communication, at step 40, from the manageable public interaction address of the user. Upon performing an outgoing communication, at step 40, the participant is exposed merely to manageable public interaction address of the user.

BEST MODE FOR CARRYING OUT THE METHOD OF THE INVENTION

Figure 2:
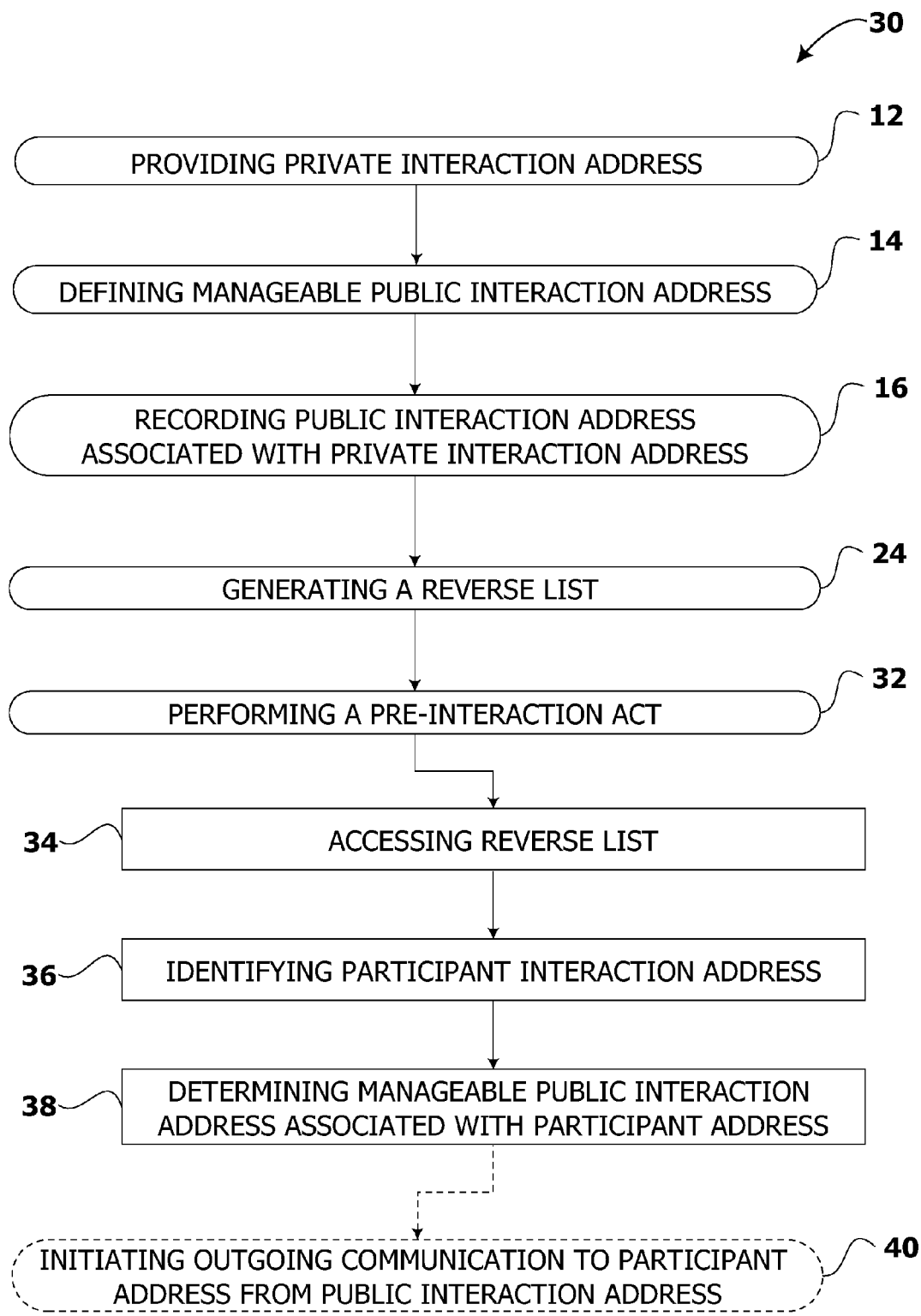
FIG. 2 is a high-level flowchart of an embodiment of the method of performing controlled pre-interaction, in accordance with another aspect of the present invention.

In accordance with some preferred embodiments of the present invention, reference is now made to FIG. 2, showing a high-level flowchart of method 30 for controlled pre-interaction. Method 30 of controlled pre-interaction commences on step 12, with providing at least one private interaction address, essentially as described hereinabove.

Thereafter at least one manageable public interaction address is defined in the system for controlled pre-interaction, at step 14. Subsequently, at step 16, at least one private interaction address, provided at step 12, is associated with at least one manageable public interaction address, defined at step 14. The association of the private interaction address with the manageable public interaction address is recorded at step 16.

Additionally at least one complete or incomplete reverse list entry is generated, at step 24, is a non-limiting manner generated: (1) manually by inputting the interaction address of the participant; (2) upon receiving an incoming communication, at step 18, automatically or by prompting the user; (3) upon performing an outgoing communication, at step 40, automatically or by prompting the user; (4) upon synchronizing data from a third party, such as external services providers, with the reverse list.

Subsequently to generating at least one reverse list entry, at step 24, the system for controlled pre-interaction performs at least one pre-interaction act, at step 32. An exemplary pre-interaction act, performed at step 32, comprises sub-step 34 of accessing reverse list. Pre-interaction act, performed at step 32, further comprises sub-step 36 of identifying the interaction address of the participant in the reverse list. Ultimately pre-interaction act, performed at step 32, includes sub-step 38 of determining the manageable public interaction address of the user, associated with the given interaction address of the participant in the reverse list.

In accordance with the preferred embodiment of method 30, shown in FIG. 2, the pre-interaction, performed at step 32, is in a non-limiting manner: not followed by a communication, followed by communication indefinite time thereafter, followed by communication of a different type, followed by communication over different network. During the pre-interaction, performed at step 32, the system for controlled pre-interaction determining the manageable public interaction address of the user, associated with the given interaction address of the participant, as recorded in the respective reverse list entry. Optionally sometime thereafter an outgoing communication may be initiated, at step 40, occasionally by a different operator and/or over a different network. For instance an e-mail address or presence address recorded in a reverse list entry is optionally followed by a communication of sharing type, indefinite time thereafter. Another instance of a reverse list entry formed upon incoming/outgoing call, followed by a communication of SMS type.

In some embodiments the system for controlled pre-interaction synchronizes contact details of a participant or simultaneously of a plurality of participants, including several interaction addresses of different types for the same participant. In such cases the pre-interaction, performed at step 32, is optionally followed by initiating an outgoing communication, at step 40, to a different interaction address and occasionally over a different network.

For example contact information of participant, including e-mail address and telephone number, can be synchronized over computer network, at step 24, due to an association of the participant to instant messaging address of the user, generating two reverse list entries for the participant, first with a manageable public e-mail address and second with manageable public telephone number of the user. These reverse list entries are optionally merely stored and/or accessed during the pre-interaction, performed at step 32, without performing outgoing or incoming communication.

Rules, Notifications and Communication Preferences

In some embodiments the system for controlled pre-interaction employs predefined rules. Rules are optionally assigned to at least one of: a private interaction address of the user (e.g. contained in the record formed at step 16), manageable public interaction address of the user (e.g. contained in the record formed at step 16 and/or in a reverse list entry generated at step 24), and interaction address of the participant (e.g. contained in a reverse list entry generated at step 24).

Rules assigned to a manageable public interaction address of the user comprise an instruction or set of instructions for a predefined response, in a situation meeting particular criteria, relating to the manageable public interaction address. Rules assigned to a manageable public interaction address of the user may for example dictate that if the manageable public interaction address is suspended or revoked, any incoming communication is in a non-limiting manner: to be rejected, to be recorded, to be converted to another format and/or forwarded to a private interaction address of the user. It should be noted that the type of communication as well as private interaction address may independently vary according to different rules. Thus if a manageable public telephone number of the user has been suspended or revoked, a rule may dictate that upon receiving an incoming phone call to the suspended or revoked manageable public telephone number, (1) the incoming phone call is to be rejected and (2) a notification about the attempted incoming phone call (e.g. time and participant number) is to be sent by SMS to the private telephone number of the user. Alternatively or additionally if a manageable public telephone number of the user has been suspended or revoked, another rule may dictate that upon receiving an incoming phone call to the suspended or revoked manageable public telephone number, (1) the incoming phone call is to be rejected and (2) a notification about the attempted incoming phone call (e.g. time and participant number) is to be sent by e-mail to the private e-mail address of the user.

Rules assigned to an interaction address of the participant comprise an instruction or set of instructions for a predefined response, in a situation meeting particular criteria, relating to the interaction address of the participant. Rules assigned to an interaction address of the participant may for example dictate that any incoming communication from the address of the participant is in a non-limiting manner: to be rejected, to be recorded, to be converted to another format and/or forwarded to a private interaction address of the user. It should be noted that the type of communication as well as private interaction address of the user may independently vary according to different rules. Thus a rule may dictate that upon receiving an incoming phone call from an interaction address of the participant, (1) the incoming phone call is to be rejected and (2) a notification about the attempted incoming phone call (e.g. time and participant number) is to be sent by SMS to the private telephone number of the user. Alternatively or additionally a rule may dictate that upon receiving an incoming phone call from an interaction address of the participant, (1) the incoming phone call is to be recorded or transcribed to text and (2) a notification including the audio file of the recording of incoming phone call or transcript of the transcribing thereof is to be sent by e-mail to the private e-mail address of the user.

Notifications are any type of media or electronic data and/or files sent or pushed by the system for controlled pre-interaction, to the user and/or participant, other than the communication itself. Notifications are typically either triggered by a communication event, e.g. assigned rules, or initiated by the system for controlled pre-interaction, for example as a part of a maintenance procedure. Notifications triggered by a communication event are typically initiated by rules assigned to at least one of: a private interaction address of the user, manageable public interaction address of the user, and interaction address of the participant.

Notifications to the user triggered by an event of incoming communication, which are optionally initiated by rules assigned to a manageable public interaction address of the user and/or interaction address of the participant, typically include at least one of: extract or synopsis with information about incoming communication (e.g. time and participant number), recording of communication (e.g. audio file) and transcript of communication (e.g. text). Notifications to the participant triggered by an event of incoming communication, which are optionally initiated by rules assigned to a manageable public interaction address of the user and/or interaction address of the participant, typically include at least one of: a notification sent in reply (namely to the same interaction address of the participant) with a preset content, by a communication of the same or different type, a pre-recorded message (e.g. audio or video file) played to the participant upon receiving an incoming communication.

Notifications initiated by the system for controlled pre-interaction are typically sent to the user and/or participant in the event the system opts to inform the user and/or participant. Notifications initiated by the system for controlled pre-interaction further include notifications provisioned by the user. Notifications initiated by the system for controlled pre-interaction in a non-limiting manner include: messages about maintenance/unavailability of the system for controlled pre-interaction, changes of tariffs charged for the service, greetings for holidays or birthdays. Notifications provisioned by the user in a non-limiting manner include a notification to all interaction addresses of participants associated in reverse list with a given manageable public address of the user, for instance that aforesaid manageable public address was revoked or suspended.

User or administrator of the system for controlled pre-interaction may define a preset content for a notification. A preset content for a notification inter alia includes: text, alphanumeric data, audio files, video files, graphics and hyperlinks. The preset content for a notification optionally defines a template with several empty fields, which are filled-in with details becoming available some time thereafter.

The system for controlled pre-interaction is preferably prescribed with default communication preferences and overruling alternative therefor. Communication preferences and overruling alternative therefor are optionally prescribed to at least one of: a private interaction address of the user (e.g. contained in the record formed at step 16), manageable public interaction address of the user (e.g. contained in the record formed at step 16 and/or in a reverse list entry generated at step 24), and interaction address of the participant (e.g. contained in a reverse list entry generated at step 24). As the method of performing controlled pre-interaction is primary aimed at safeguarding the privacy of the user, a default communication preference typically prescribes indicating for communication the manageable public address of the user as determined in sub-step 38 of a pre-interaction act, performed at step 32.

However in some preferred embodiments communication preferences are prescribed with overruling alternative/s therefor. Thus for instance if the network associated with the manageable public address of the user as determined in sub-step 38 of a pre-interaction act, performed at step 32, an overruling alternative of the default communication preference may indicate an alternative manageable public interaction address of the user or even the private interaction address of the user for a communication session. Alternatively or additionally if the communication costs associated the manageable public address of the user as determined in sub-step 38 of a pre-interaction act, performed at step 32, exceed a predefined threshold, an overruling alternative of the default communication preference may indicate an alternative manageable public interaction address of the user or even the private interaction address of the user for a communication session, wherein the costs precede the predefined threshold. Therefore in order to implement an overruling alternative of the default communication preference, the system of controlled pre-interaction optionally accesses to and/or retrieves data from at least of the following: the record formed at step 16, a reverse list entry generated at step 24 and an external reference or source of information (e.g. tariffs table); in order to determine the alternative for manageable public address of the user as determined in sub-step 38 of a pre-interaction act, performed at step 32.

The System for Controlled Pre-Interaction

Figure 3:
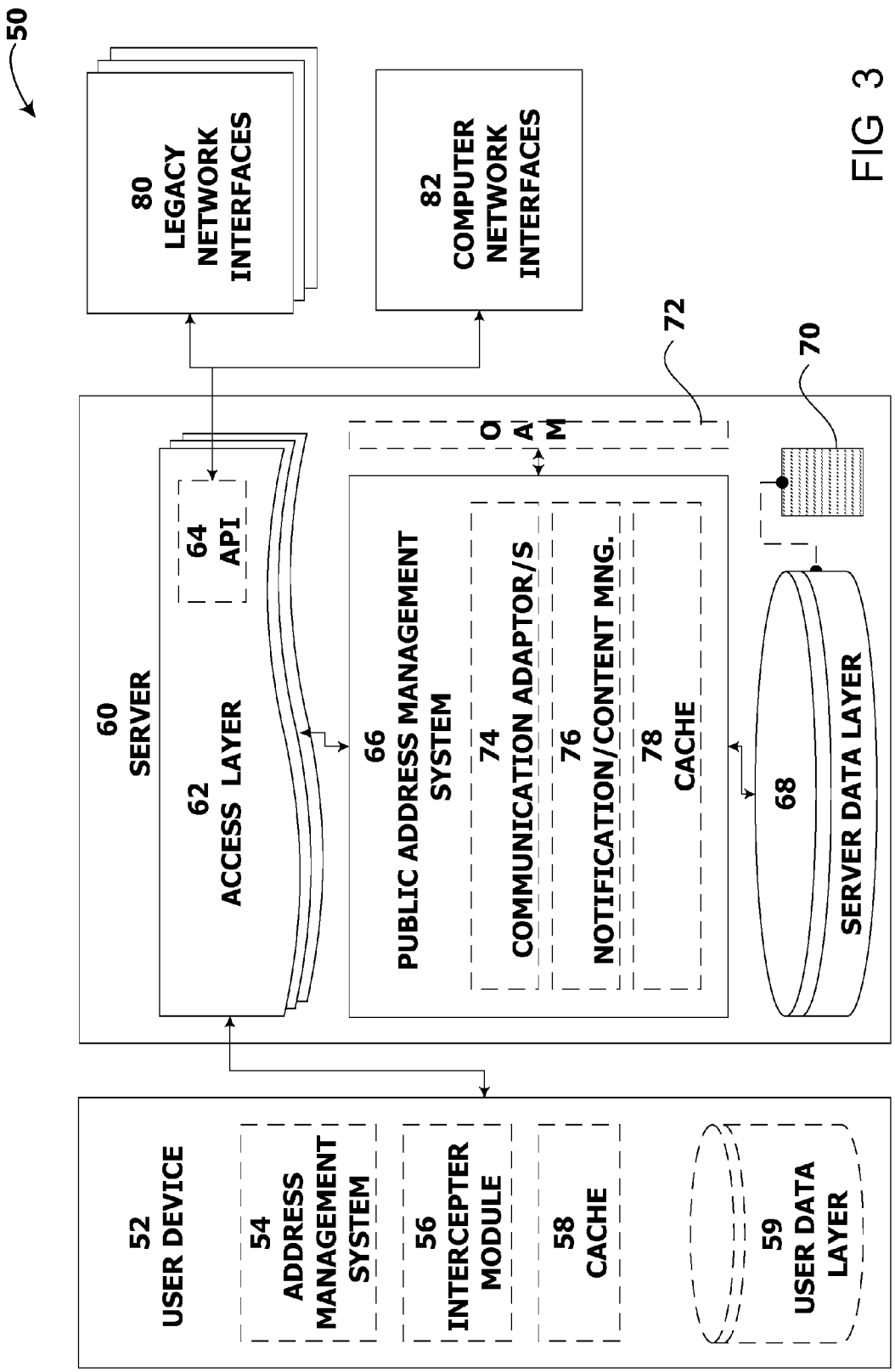
FIG. 3 is a schematic diagram of an embodiment of the system for controlled pre-interaction, in accordance with the present invention.

In accordance with some preferred embodiments of the present invention, reference is now made to FIG. 3, showing a block diagram of system 50 for controlled pre-interaction. System 50 for controlled pre-interaction comprises user device 52. User device 52 is an electronic device, comprising a user interface (not shown) assessable by the user. In some embodiments the user interface of user device 52 in a non-limiting manner includes: a GUI (e.g. screen), sound reproducing device (e.g. speakers or headphones), sound collecting device (e.g. microphone), an imaging device (e.g. video camera), inputting device (e.g. keyboard or dialing pad), etc.

It would be appreciated that depending on various implementations of system 50 for controlled pre-interaction optionally embodies a plurality of different electronic devices which are operable as user device 52 is system 50. In instances of e-mail communication, instant messaging (IM) communication, voice over IP (VoIP) communication or presence communication it is rather common that the same account is accessed from different devices.

It would be further appreciated that depending on various implementations of system 50 for controlled pre-interaction the very same electronic device embodies a plurality of user devices 52 of different systems 50 of communications of different types. In instances of versatile devices (e.g. personal computers), the same device is frequently operable for providing the user/communication interface of several communications of different types (e.g. e-mail, IM and presence communications).

Moreover it would be appreciated that depending on various implementations of system 50 for controlled pre-interaction the very same electronic device embodies a plurality of user devices 52 of different systems 50 of communication of the same type. For instance a single dual-SIM mobile phone is optionally operable as two different user devices 52 or the same computer is used to access a plurality of different communication accounts.

Device 52 of system 50 optionally comprises address management system 54, which is capable of performing some or all steps of method 10 for controlled reciprocating communication and/or method 30 for controlled pre-interaction, as described in FIGS. 1 and 2. Typically, additionally to address management non-limiting manner system 54, device 52 of system 50 comprises user data layer 59, in a non-limiting manner storing: the record of public interaction addresses and association thereof to private interaction addresses formed at step 16, the entries of reverse list generated at step 24, as well as optionally: list of public identities assigned to manageable public interaction address, name and/or metadata assigned to manageable public interaction address, name and/or metadata assigned to interaction addresses of participants, rules relating to notification, predefined content for notifications, a default communication preference for interaction addresses of participants and/or overruling alternative for the default communication preference for interaction address of participants, personal information and/or contact information of participant.

Device 52 of system 50 optionally further comprises intercepter module 56. Intercepter module 56 is capable of monitoring the activity of device 52 and detecting initiation or occurrence of communication. Upon detecting initiation or occurrence of communication on device 52, intercepter module 56 optionally disables a communication from the outset, halts or otherwise prevents further progression of communication on device 52. Alternatively or additionally upon detecting initiation or occurrence of communication on device 52, intercepter module 56 optionally redirects the communication, according to the default communication preference, to the manageable public interaction address of the user associated in a reverse list entry with a given interaction address of participant or according to the overruling alternative for the default communication preference, to a private interaction address or manageable public interaction address other than manageable public interaction address associated in a reverse list entry with a given interaction address of participant.

Alternatively or additionally upon detecting initiation or occurrence of communication on device 52, intercepter module 56 inter alia performs: presenting to the user details/data/name/metadata of the record of public interaction addresses formed at step 16, presenting to the user details/data/name/metadata of entries in reverse list generated at step 24, prompting the user for further progression of communication on device 52 or prompting the user for further progression of communication and providing preset options for further progression of communication on device 52. Alternatively or additionally during an occurrence or upon completion of communication on device 52, intercepter module 56 presents and/or prompts to the user proposed details/data/name/metadata for a newly suggested reverse list entry to be generated at step 24.

Device 52 of system 50 optionally further comprises cache module 58, typically for sustaining fluent data exchange, between user device 52 and server 60 of system 50, even during interruptive communication therebetween. Cache module 58 typically employs RAM, SDRAM and/or Flash memory on device 52.

FIG. 3 shows an embodiment of system 50 which employs a client-server configuration, of user device 52 and server 60. It would be appreciated, however, that depending on various configurations, system 50 employs thin-server or no-server configuration, wherein some or all components of server 60 are optionally present on and operable by user device 52. Moreover depending on various configurations, such as feature phone or line phone device with legacy telephony, system 50 optionally employs a thin-client or no-client configurations, where user device 52 comprises merely a minimal user interface, whereas the steps of the method for controlled pre-interaction are performed by server 60. Server 60 may act as full server for some user device 52, and as a partial or thin-server for a different user device 52, concurrently.

Server 60 of system 50 typically includes access layer 62. Access layer 62 typically comprises a plurality of communication protocols, adapted to sustain communication between user device 52 and server 60. Access layer 62 of server 60 is connected to and is capable of sustaining communication with user device 52 of system 50. Access layer 62 of server 60 is connected to and is capable of sustaining communication with at least one network interface of system 50, as explained below. Access layer 62 preferably includes an application programming interface 64 (API) to communicate with other software components.

Server 60 of system 50 comprises public address management system 66. Public address management system 66 of server 60 is capable of performing some or all steps of method 10 for controlled reciprocating communication and/or method 30 for controlled pre-interaction, as described in FIGS. 1 and 2. Typically, additionally to public address management system 66, server 60 comprises server data layer 68, in a non-limiting manner storing: the record of public interaction addresses and association thereof to private interaction addresses formed at step 16, the entries of reverse list 70 generated at step 24, as well as optionally: list of public identities assigned to manageable public interaction address, name and/or metadata assigned to manageable public interaction address, name and/or metadata assigned to interaction addresses of participants, rules relating to notification, predefined content for notifications, a default communication preference for interaction addresses of participants and/or overruling alternative for the default communication preference for interaction address of participants, personal information and/or contact information of participant.

Preferably server 60 comprises operations, administration and management (OA&M) module 72. OA&M module 72 is inter alia employed for: provisioning, auditing, log recording, billing and alike of various operations performed by public address management system 66 and/or in server data layer 68.

Public address management system 66 of server 60 optionally further comprises at least one communication adaptor 74. Communication adaptor 74 of server 60 functions essentially similarly to intercepter module 56 of device 52 but in specific types of communication and certain networks, such as telephony/legacy networks, communication adaptor 74 of server 60 optionally employs solely a monitoring and notification scheme and does not actually halt or prevent further progression of a communication. Communication adaptor 74 of server 60 is capable of monitoring the activity on device 52 and/or and detecting initiation or occurrence of communication on device 52 and/or server 60. Upon detecting initiation or occurrence of communication on device 52 and/or server 60, communication adaptor 74 optionally halts or otherwise prevents further progression of communication on device 52 and/or server 60. Alternatively or additionally upon detecting initiation or occurrence of communication on device 52 and/or server 60, communication adaptor 74 optionally redirects the communication, according to the default communication preference, to the manageable public interaction address of the user associated in a reverse list entry with a given interaction address of participant or according to the overruling alternative for the default communication preference, to a private interaction address or manageable public interaction address other than manageable public interaction address associated in a reverse list entry with a given interaction address of participant.

Alternatively or additionally upon detecting initiation or occurrence of communication on device 52 and/or server 60, communication adaptor 74 inter alia: presents to the user details/data/name/metadata of the record of public interaction addresses formed at step 16, presents to the user details/data/name/metadata of entries in reverse list generated at step 24, prompts the user for further progression of communication on device 52 and/or server 60, or prompts the user for further progression of communication and provides preset options for further progression of communication on device 52 and/or server 60. Alternatively or additionally during an occurrence or upon completion of communication device 52 and/or server 60, communication adaptor 74 presents and/or prompts to the user proposed details/data/name/metadata for a newly suggested reverse list entry to be generated at step 24.

Server 60 of system 50 optionally further comprises cache and/or in-memory database (IMDB) module 78, typically for sustaining fluent data exchange, between user device 52 and server 60 of system 50, even during interruptive communication therebetween. Cache module and/or in-memory database 78 typically employs RAM, SDRAM, Flash memory or fast disks on server 60.

System 50 further comprises at least one network interface selected from: legacy network interface/s 80 and computer interface/s 82. Legacy network interface 80 and/or computer interface 82 are connected to access layer 62 of server 60. Legacy network interface 80 and/or computer interface 82 are preferably commendable with access layer 62 via application programming interface 64 (API) of the latter.

Legacy network interface 80 and/or computer interface 82 of system 50 are characterized by the capability to perform an incoming and/or outgoing communication from at least one manageable public address, as listed in an entry of reverse list 70, in server data layer 68 and/or user data layer 59. System 50 typically performs an outgoing communication of step 40 from a manageable public address, as in an entry of reverse list 70, on server data layer 68 and/or user data layer 59, in either of the three of the following modes: (1) a proxy mode; (2) forwarding mode, and (3) redirecting to another system 50 mode.

In proxy mode, which is typically applicable in situations where system 50 is operable by the communication provider itself, the participant is merely presented with a manageable public address of the user, whereas the communication de facto is performed from a private interaction address of the user. The aforementioned merely presenting to the participant a manageable public address of the user may be referred as "disguising" the actual private interaction address of the user. The disguising the actual private interaction address of the user is typically applicable in various types of computer networks communication such as: e-mail communication, VoIP communication, presence communication and IM communication.

In forwarding mode, system 50 forwards the communication from a private interaction address of the user to a manageable public address of the user, listed in an entry of reverse list 70, on server data layer 68 and/or user data layer 59. The communication forwarded from a private interaction address of the user to a manageable public address of the user is then addressed to the interaction address of the participant. In forwarding mode, performing an outgoing communication of step 40, entails sustaining two communication sessions, namely first from a private interaction address of the user to a manageable public address of the user and second from aforesaid manageable public address to the interaction address of the participant. It is noted that forwarding mode is particularly applicable for legacy/telephony networks.

In redirecting mode the communication is redirected from system 50, having a network interface of private interaction address of the user, to another system 50, having a network interface of the manageable public address of the user, listed in an entry of reverse list 70, on server data layer 68 and/or user data layer 59. The redirecting mode is particularly applicable in implementations where a plurality of systems 50, of communications of the same type, is operable on a singular user device 52.

In instances of a multi-SIM phone, namely wherein the same device embodies user device 52A, associated with a private interaction address of the user, as well as user device 52B, associated with a manageable public interaction address of the user, the performing an incoming and/or outgoing communication from at least one manageable public address, as listed in an entry of reverse list 70, in server data layer 68 and/or user data layer 59, at step 40, is typically performed in either of the three of the above-listed modes: (1) a proxy mode; (2) forwarding mode, and (3) redirecting to another system 50 mode. In proxy mode, the communication is performed while merely presenting a manageable public address of the user to the participant, whereas the communication de facto is performed from a private interaction address of the user, optionally by employing interceptor module 56 of user device 52A and/or communication adaptor of server 60. In forwarding mode the communication is typically forwarded from the SIM associated with a private interaction address of the user to the telephone number of the SIM associated with a manageable public address of the user. In redirecting to another system 50 mode, system 50A of the SIM associated with a private interaction address of the user redirects the communication, such as phone call or SMS, to another system 50B of the SIM associated with a manageable public interaction address of the user.

In accordance with some preferred embodiments of the present invention, reference is now made to FIG. 4, showing block diagram of system 100, including system 50A for controlled pre-interaction and optionally controlled reciprocating communication of user party A system 50A with system 50B of participant party B, as well as user devices 52C and 52D of participant parties C and D respectively. Parties A to D in system 100 are connected to and communicable over network 90 via connections 81A to 81D, respectively. It should be acknowledged that for the sake of simplicity network 90 is shown in FIG. 4 as an exemplary singular network; whereas depending on various types of communication, network 90 embodies a plurality of networks of different types, such as legacy/telephony networks and computer networks. Moreover it should be acknowledged that particular branch connections 81A to 81D, of parties A to D, on network 90 shown in FIG. 4, are optionally different networks of the same type, such as GSM, CDMA and 3GPP mobile networks.

System 100 preferably comprises at least one third party, such as external services providers 95, capable for controlled pre-interaction for user party A. External services providers 95 as referred to herein are to be construed inter alia as a source of personal and/or contact information about participant party B to D, including at least one interaction address of participant party B to D. For example external services providers 95, which is/are exemplarily presence server/s for at least one party A to D, may contain a telephone numbers of parties B to D, which are also connected to presence server 95 of user party A. System 100, as a part of controlled pre-interaction for user party A, may initially determine that the presence address of participant party B to D is associated in a reverse list entry of system for controlled pre-interaction 50A with a manageable public presence address of user party A and/or certain public profile of user party A. System for controlled pre-interaction 50A is then optionally synchronizes the telephone numbers of participant party B to D, for example from external services providers 95, such as servers presence of participant party B to D, with at least manageable public telephone number of user party A, based on the appurtenance thereof to a manageable public presence address of user party A and/or certain public profile of user party A.

System for controlled pre-interaction 50A is then typically either automatically generates a plurality of reverse list entries, wherein manageable public telephone number of user party A is associated with telephone numbers of participant party B to D, or prompts the user with details of newly suggested reverse list entries prior to generating the same. System for controlled pre-interaction 50A is then capable of determining the manageable public telephone number of user party A associated with telephone numbers of participant party B to D, by accessing the reverse list, an optionally merely stores such determined manageable public telephone number of user party A for a possible later communication by phone, even despite the fact that party A has never been in touch by telephone with participant party B to D and never personally obtained the telephone numbers of participant party B to D.

It should be acknowledged however that despite the exemplary division of system 100, shown in FIG. 4, participant party B to D user devices 52B to 52D respectively, network 90 and/or external services providers 95 are optionally, partially or entirely, integrated in system for controlled pre-interaction 50A.

According to FIG. 4 participants of various types are concomitantly served to system 100. Thus participant parties B to D user devices 52B to 52D are optionally of different types, namely having different functional capabilities/limitations. Thus participant party B optionally has system for controlled pre-interaction 50B of his/her own. Party B in such a case is capable of controlled pre-interaction with party A, from a manageable public address of party B to a manageable public address of party A.

Participant party C may have a user device 52C or integrated user module 58C, which are optionally a mobile phone built on a mobile operating system (e.g. Smartphone) with relatively more advanced computing capability and connectivity; whereas party D may have a user device 52D, which is a line telephone or mobile feature phone with relatively more limited computing capability and connectivity. Typically with user device 52D having limited computing capability and connectivity, such as DECT phone and feature phone, system 50 optionally employs a thin-client or no-client configurations, where user device 52D comprises merely a minimal user interface, whereas the steps of the method for controlled pre-interaction are performed by system 50. Therefore systems for controlled pre-interaction 50A and 50B are capable to sustain a controlled pre-interaction among parties A to D and optionally a controlled reciprocating communication of parties A through D.

Multiple Parties Pre-Interaction

In accordance with some preferred embodiments, systems 50A and 50B are adapted to sustain a controlled pre-interaction capable among multiple parties, such as parties A to D. A participant in a multi-party communication and/or conferencing is referred to herein as participant.

For instance party C is added to or creates a VoIP chatting conferencing communication performed between parties A to D, while the VoIP chat of party A with party C is performed from a different manageable public VoIP screen name than the VoIP screen name of the chat of party A with party B.

Alternatively or additionally, multiple parties' pre-interaction is initiated upon proposing a contact, friend or connection of party C for user party A by participant party B; for a presence communication, IM communication, VoIP communication, audio and/or video conferencing communication etc. For instance a presence address of party C may be suggested by participant party B to user party A or a connection request (e.g. handshake) may be sent by participant party B to user party A on behalf of party C, while the manageable public presence address of user party A provided to party C is different than the manageable public or private presence address of party A available to party B.

Alternatively or additionally, multiple parties pre-interaction is initiated upon sharing, posting, publishing or notifying electronic files or data (e.g. content), with/to participant party C by user party A previously shared, posted, published or notified with/to party B. For instance electronic files or data (e.g. content) may be shared, posted, published or notified by user party A with/to participant party C using a manageable public interaction address (e.g. sharing address, presence address or IM address) that is different than the manageable public or private interaction address (e.g. sharing address, presence address or IM address) from/at which party A has previously shared, posted, published or notified aforesaid electronic files and/or data with/to party B.

Examples

According to first example, party A is a landlord renting a house. Landlord party A hence defines a manageable public telephone number, for the purposes of communicating with potential tenants, such as parties B to D. Landlord party A then publishes the manageable public telephone number, for instance in a local newspaper. Potential tenants, such as parties B to D, then optionally call the manageable public telephone number, to contact landlord party A. Landlord party A generates reverse list entries for tenants parties B to D and then in turn can contact tenants parties B to D from the manageable public telephone number, whilst keeping the private telephone number of landlord party A discreet from tenants parties B to D.

According to second example, party A has a dual-SIM mobile phone, wherein the telephone number of one SIM is defined as the private interaction address of party A, whereas the telephone number of another SIM is defined as the manageable public interaction address of party A. The dual-SIM mobile phone in such example embodies the user device, associated with a private interaction address of party A, as well as the user device, associated with a manageable public interaction address of party A. The dual-SIM mobile phone optionally further includes the public interaction address management system and reverse list registry of party A. Party A thence is able to perform an incoming and/or outgoing communication in a controlled manner—namely from the telephone number of another SIM which is defined as the manageable public address of party A and listed in an entry of reverse list as associated with telephone numbers of participant parties, such as parties B to D.

According to third example, party A is a landlord renting a house. Landlord party A hence defines a manageable public telephone number, for the purposes of communicating with potential tenants, such as party B. Potential tenant party B may also implement a system for controlled pre-interaction. Potential tenant party B generates a reverse list entry for landlord for party A and then contacts landlord for party A from the manageable public telephone number of tenant party B and to the manageable public telephone number of landlord party A, whilst keeping the private telephone number of tenant party B discreet from landlord party A.

According to fourth example, party A is a popular person, defining a manageable public telephone number, for supporters or followers parties B to D expiring after several hours or days. Popular person party A then defines a rule that upon expiration any incoming communications to manageable public telephone number, listed in the public addresses record, is replied to with SMS having predefined content, such as party A that is currently unavailable and/or when one should try again to reach party A.

According to fifth example, party A is a member of a professional or social computer network, such as LinkedIn. Party A is then optionally inspects a profile of member party B on aforesaid network. Upon such inspecting of the profile of member party B, party A is optionally advised on the profiles of other members who had inspected or connected with member party B. Thereafter the system optionally indicates which of the profiles of party B were inspected and accordingly may be advised for party A profile. A reverse list is then optionally generated, preferably automatically, in the public address management system, listing the public profile of party B and optionally associating the profile of the inspecting party A, typically either automatically or in according with predefined preference. Later communications via the professional network or via other interaction means, from party A to party B, will expose particular profile details of party B.

According to sixth example, party A is a member of a social computer network, such as Facebook, identified by a public Facebook interaction address. Party A is then optionally inspects, accesses, searches, views, befriends, pokes or otherwise connects or attempts a connection with party B, who is another member of the same social network, which may be collectively referred to as an interaction or inspection. The system will consider such an interaction or inspection as a form of interaction as defined herein and will ensure that information of party B exposed to A, matches party B privacy requirements, as well as any other communication for that matter.

In the instance of social network, party B may have multiple profiles that may include multiple profile information elements (e.g. different contact fields, languages spoken, address location or any other profile information). When party A inspects party B, he may be exposed to a specific profile or subset of profiles of party B, based on various criteria. This criteria may include a pre-determined rules or grouping (such as party B putting party A in a specific group of friends), based on the actual profile information of party A (e.g. gender, city or country, age or age-group, workplace, education or other), the actual inspection or interaction details (such as country inferred from IP address of party A inspection, time or date of inspection, type of device used by party A for the inspection, computer network type used for the inspection, etc.) or any other criteria for that matter.

Consequently, a reverse list is optionally generated, preferably automatically, in the public address management system of party B, identifying which of the public profiles of party B is to be exposed to party A denoted by party A social network interaction address. The details of party B that A was exposed to based on this criteria will be associated for future interactions or communications.

Note that in this case no specific communication between A and B was yet performed. Future such inspections, or communications within the Social Network, or outside of it using any other means of communication, will use the reverse list and associated profile information as described in this invention, an accordingly maintain B privacy.

According to seventh example, party A is an employee or contractor in an organization. Parties B to D are optionally coworkers or clientele of party A. An administrator of the system for controlled pre-interaction is then can import, synchronize or provision a plurality of reverse list entries for party A, wherein the interaction addresses of parties B to D are associated with a manageable public interaction address of party A dedicated for work purposes.

Patent Literature References

US patent Ser. No. U.S. Pat. No. 7,995,730, U.S. Pat. No. 7,436,943, U.S. Pat. No. 7,602,894
US patent application Ser. No. US2010/054444, US2012/328089
GB patent application Ser. No. GB2454886
European patent application Ser. No. EP2073521, EP2448227
PCT applications Pub. No. WO2007/053768, WO2010/135000

Non Patent Literature References

Request for Comments: 3261—Session Initiation Protocol Available at: http://www.ietf.org/rfc/rfc3261.txt
Request for Comments: 5627—Obtaining and Using Globally Routable User Agent URIs (GRUUs) in the Session Initiation Protocol (SIP) Available at: http://tools.ietf.org/html/rfc5627

3GPP TS 23.228 V5.13.0—3rd Generation Partnership Project (2004-12) Available at: http://www.ipt.etsi.org/iptlib/iptLib/BaseDocs/3GPP23.228.htm Instant Messaging draft-saintandre SIP-XMPP-IM-01 (Mar. 8, 2009) Available at: http://tools.ietf.org/html/draft-saintandre-sip-xmpp-im-01

One-to-one text chat draft-saintandre SIP-XMPP-CHAT-03 (Mar. 8, 2009) Available at: http://tools.ietf.org/html/draft-saintandre-sip-xmpp-chat-03

Presence Draft-Saintandre XMPP-PRESENCE-02 (Mar. 8, 2009) Available at: http://tools.ietf.org/html/draft-saintandre-sip-xmpp-precense-02

It will be appreciated by persons skilled in the art that the present invention is not limited by what has been particularly shown and described herein above. Rather the scope of the invention is defined by the claims which follow:

The invention claimed is:

1. A method of performing controlled reciprocating communication, wherein said controlled reciprocating communication comprises an incoming and outgoing communications, between a first party and at least one second party, said method comprises:
   (a) providing at least one private interaction address of said first party;
   (b) defining at least one manageable public interaction address for said first party;
   (c) forming a record, wherein said manageable public interaction address is associated with said private interaction address for said first party;
   (d) receiving an incoming communication, said incoming communication comprises a communication from said second party to said first party; wherein said incoming communication is initiated by said second party to said manageable public interaction address of said first party;
   (e) identifying that said incoming communication was received to said manageable public interaction address;
   (f) accessing said record and performing at least one step selected from the group consisting of:
      (I) determining said respective identity associated with said manageable public interaction address identified in said incoming communication, and
      (II) determining said private interaction address of said first party associated at said record with said manageable public interaction address identified in said incoming communication;
   said method is characterized by:
   (g) generating at least one reverse list entry, wherein an interaction address of said second party is associated at least with said manageable public interaction address of said first party;
   (h) performing a pre-interaction act, said pre-interaction act comprises:
      (I) accessing said reverse list;
      (II) identifying said interaction address of said second party in said reverse list;
      (III) determining that said manageable public interaction address of said first party is associated, at said reverse list, with said interaction address of said second party;
   (i) performing an outgoing communication, said outgoing communication comprises a communication from said first party to said second party, said outgoing communication is initiated by said first party;
   (j) said outgoing communication is characterized by that said outgoing communication, to said interaction address of said second party, is performed from said manageable public interaction address of said first party;
   wherein upon performing said outgoing communication, said second party is exposed merely to said manageable public interaction address of said first party;
   wherein said interaction address of said second party is obtainable from a third party or external services provider, wherein said at least one reverse list entry is formed by synchronizing said interaction address of said second party with said manageable public interaction address.

2. The method of performing controlled reciprocating communication as set forth in claim 1, wherein said steps of defining and forming further comprise:
   (a) defining a respective identity of said first party, for said manageable public interaction address of said first party, and
   (b) forming a record associating said respective identity of said first party with said manageable public interaction address of said first party.

3. The method of performing controlled reciprocating communication as set forth in claim 2, wherein said step of determining further comprises determining that said interaction address of said second party is associated, at said reverse list, with said respective identity of said first party.

4. The method of performing controlled reciprocating communication as set forth in claim 1, wherein said communication comprises a communication selected from the group consisting of: an attempted communication, incomplete communication, rejected communication, interrupted communication and abrupted communication.

5. The method of performing controlled reciprocating communication, as set forth in claim 1, wherein said interaction address selected from the group consisting of: a line telephone number, line facsimile number, cellular/mobile phone number, instant messaging (IM) name, e-mail address, presence screen name, service handle, universal resource identifier (URI), universal resource name (URN), universal resource locator (URL), extensive resource identifier (XRI), SIP identifier, any type of user identifier for sharing or and any type of user identifier communication.

6. The method of performing controlled reciprocating communication as set forth in claim 1, wherein said interaction address is a partial interaction address, comprising a portion of said string of characters or a sub-string thereof or wherein said string is defined as including at least one wildcard, representing more than one participant having identical portions in their interaction addresses.

7. The method of performing controlled reciprocating communication, as set forth in claim 1, wherein said step of determining said private interaction address, during said step of accessing said record, further comprises performing at least one step selected from the group consisting of:
   (a) forwarding said incoming communication to said at least one private interaction address associated with said manageable public interaction address at said record;
   (b) forwarding information regarding said incoming communication to said at least one private interaction address associated with said manageable public interaction address at said record;
   (c) presenting said manageable public interaction address to which said incoming communication was received;
   (d) presenting at least one information item selected from the group consisting of:
      (I) a name assigned to said manageable public interaction address;

(II) metadata assigned to said manageable public interaction address;
(III) public identity assigned to said manageable public interaction address;
(e) applying a notification rule to said incoming communication;
(f) selecting contents for said notification.

8. The method of performing controlled reciprocating communication, as set forth in claim 1, wherein said reverse list further comprises at least one constituent selected from the group consisting of: a name assigned to said manageable public interaction address; metadata assigned to said manageable public interaction address; a public identity assigned to said manageable public interaction address; a rule relating to a notification; a content for said notification; a default communication preference; an overruling alternative for said default communication preference; personal information of said second party; contact information of said second party.

9. The method of performing controlled reciprocating communication, as set forth in claim 1, wherein generating said reverse list is performed by at least one selected from the group consisting of: said first party; a user of a system for controlled reciprocating communication; an operator of said system for controlled reciprocating communication; a third party related to said system for sustaining a controlled reciprocating communication, and external services providers for said system for sustaining a controlled reciprocating communication.

10. The method of performing controlled reciprocating communication, as set forth in claim 1, wherein said reverse list entry is generated in at least one manner selected from the group consisting of: manually by inputting said interaction address of said second party; upon receiving said incoming communication; upon performing said outgoing communication; by external services providers for a system for sustaining a controlled reciprocating communication.

11. The method of performing controlled reciprocating communication, as set forth in claim 1, wherein said interaction address of said second party is unavailable to said first party, wherein at least a portion of said reverse list entry is confidential to said first party.

12. The method of performing controlled reciprocating communication, as set forth in claim 1, wherein said reverse list entry is generated upon said outgoing communication, is performed in at least one manner selected from the group consisting of:
(a) automatically upon identifying said manageable public interaction address from which said second party is contacted
(b) by prompting said first party with a proposed reverse list entry and completed upon confirmation of said first party to form said entry.

13. The method of performing controlled reciprocating communication, as set forth in claim 1, further comprises performing at least one predefined rule, said rule comprises at least one instruction for a predefined response, wherein said response selected from the group consisting of: rejecting a communication; recording a communication; converting a communication to another format; forwarding a communication to said private interaction address of said first party.

14. The method of performing controlled reciprocating communication, as set forth in claim 1, further comprises prescribing at least one communication preference selected from the group consisting of: a default communication preference and overruling alternative for said default communication preference, said communication preference is assigned to at least one selected from the group consisting of:
(a) said private interaction address of said first party, contained in said record
(b) said manageable public interaction address of said first party, contained in said record or said reverse list, and
(c) said interaction address of said second party, contained in said reverse list.

15. The method of performing controlled reciprocating communication, as set forth in claim 1, further comprises prescribing at least one default communication preference, wherein said default communication preference indicates said manageable public interaction address of said first party, determined at said step of determining during said pre-interaction act.

16. The method of performing controlled reciprocating communication, as set forth in claim 1, further comprises prescribing at least one default communication preference, wherein said default communication preference indicates said manageable public interaction address of said first party, determined at said step of determining during said pre-interaction act, and further comprises an overruling alternative for said default communication preference, wherein said overruling alternative indicates an alternative manageable public interaction address of said first party or said private interaction address of said first party for a particular communication session, if a predefined condition is met.

17. A method of performing controlled pre-interaction, between a first party and at least one second party, said method comprises:
(a) providing at least one private interaction address of said first party;
(b) defining at least one manageable public interaction address for said first party;
(c) forming a record, wherein said manageable public interaction address is associated with said private interaction address for said first party;
said method is characterized by:
(d) generating a reverse list, wherein an interaction address of said second party is associated at least with said manageable public interaction address of said first party;
(e) performing at least one pre-interaction act, said pre-interaction act comprises:
(I) accessing said reverse list;
(II) identifying said interaction address of said second party in said reverse list;
(f) determining that said manageable public interaction address of said first party is associated, at said reverse list, with said interaction address of said second party; wherein said interaction address of said second party is obtainable from a third party or external services provider, wherein said at least one reverse list entry is formed by synchronizing said interaction address of said second party with said manageable public interaction address.

18. The method of performing controlled pre-interaction, as set forth in claim 17, wherein said method is not followed by a communication.

19. The method of performing controlled pre-interaction, as set forth in claim 17, wherein said method is followed by a communication to another interaction address of said second party, wherein said another interaction address of said second party is of a different type than said interaction address of said second party.

20. The method of performing controlled pre-interaction, as set forth in claim 17, wherein said interaction address of said second party is obtainable from a third party comprises several interaction addresses of different types of said second party.

21. The method of performing controlled pre-interaction, as set forth in claim 17, further comprises performing at least one predefined rule, said rule comprises at least one instruction for a predefined response, wherein said response selected from the group consisting of: recording a communication; converting a communication to another format; forwarding a communication to said private interaction address of said first party.

22. The method of performing controlled pre-interaction, as set forth in claim 17, further comprises performing at least one predefined rule, said rule is assigned to at least one selected from the group consisting of: said private interaction address of said first party, contained in said record; said manageable public interaction address of said first party, contained in said record or said reverse list, and said interaction address of said second party, contained in said reverse list.

23. The method of performing controlled pre-interaction, as set forth in claim 17, further comprises prescribing at least one communication preference selected from the group consisting of: a default communication preference and overruling alternative for said default communication preference, said communication preference is assigned to at least one selected from the group consisting of: said private interaction address of said first party, contained in said record, said manageable public interaction address of said first party, contained in said record or said reverse list, and said interaction address of said second party, contained in said reverse list.

24. The method of performing controlled pre-interaction, as set forth in claim 17, further comprises prescribing at least one default communication preference, wherein said default communication preference indicates said manageable public interaction address of said first party, determined at said step of determining during said pre-interaction act.

25. The method of performing controlled pre-interaction, as set forth in claim 17, further comprises prescribing at least one default communication preference, wherein said default communication preference indicates said manageable public interaction address of said first party, determined at said step of determining during said pre-interaction act, and further comprises an overruling alternative for said default communication preference, wherein said overruling alternative indicates an alternative manageable public interaction address of said first party or said private interaction address of said first party for a particular communication session, if a predefined condition is met.

26. Non-transitory computer readable media having computer-executable instructions embodied thereon, that when executed by a computing system, perform a method of controlled reciprocating communication, the non-transitory computer readable media comprising instructions as set forth in claim 17.

27. A system for performing a controlled pre-interaction, between a first party and at least one second party, said system comprises:
  (a) at least one member selected from the group consisting of: a graphical user interface, input device and computer networking terminal, configured for providing at least one private interaction address of said first party;
  (b) at least one member selected from the group consisting of: a graphical user interface, input device and computer networking terminal, configured for defining at least one manageable public interaction address for said first party;
  (c) at least one non-transitory computer storage memory configured for forming and storing a record, wherein said manageable public interaction address is associated with said private interaction address for said first party;
  (d) at least one computer non-transitory storage memory configured for forming and storing at least one reverse list entry, wherein an interaction address of said second party is associated at least with said manageable public interaction address of said first party;
  (e) at least one microprocessor configured for accessing said reverse list;
  (f) at least one microprocessor configured for identifying said interaction address of said second party in said reverse list; and
  (g) at least one microprocessor configured for determining whether said manageable public interaction address of said first party is associated, at said reverse list, with said interaction address of said second party;
wherein said interaction address of said second party is obtainable from a third party or external services provider, wherein said at least one reverse list entry is formed by synchronizing said interaction address of said second party with said manageable public interaction address.

28. The system for performing a controlled pre-interaction, as set forth in claim 27, further comprises a networking terminal configured for performing a controlled outgoing communication, said controlled outgoing communication comprises a communication from said first party to said second party, said controlled outgoing communication is initiated by said first party, wherein initiating of said controlled outgoing communication, to said interaction address of said second party, is performed from said manageable public interaction address of said first party.

29. The system for performing a controlled pre-interaction, as set forth in claim 27, further comprises a networking terminal configured to receive said incoming communication, wherein said receiving of said incoming communication is performed by at least one networking terminal selected from the group consisting of:
  (a) a networking terminal configured for receiving said incoming communication from said second party to said first party; wherein said incoming communication is initiated by said second party to said manageable public interaction address of said first party;
  (b) a networking terminal configured identifying that said incoming communication was received to said manageable public interaction address;
  (c) a networking terminal configured accessing said record and determining said respective identity associated with said manageable public interaction address identified with said means of identifying.

30. The system for performing a controlled pre-interaction, as set forth in claim 27, wherein said controlled pre-interaction is not followed by a communication.

31. The system for performing a controlled pre-interaction, as set forth in claim 27, wherein said pre-interaction is followed by a communication to another interaction address of said second party, wherein said another interaction address of said second party is of a different type than said interaction address of said second party.

32. The system for performing a controlled pre-interaction, as set forth in claim 27, wherein said interaction address of said second party is obtainable from a third party comprises several interaction addresses of different types of said second party.

33. The system for performing a controlled pre-interaction, as set forth in claim 27, further comprises at least one microprocessor configured for executing at least one predefined rule selected from the group consisting of: recording a communication, converting a communication to another format, forwarding a communication to said private interaction address of said first party.

34. The system for performing a controlled pre-interaction, as set forth in claim 27, further comprises at least one microprocessor configured for executing at least one predefined rule, said rule is assigned to at least one member selected from the group consisting of: said private interaction address of said first party, contained in said record; said manageable public interaction address of said first party, contained in said record or said reverse list, and said interaction address of said second party, contained in said reverse list.

35. The system for performing a controlled pre-interaction, as set forth in claim 27, further comprises at least one non-transitory computer storage memory configured to store therein at least one communication preference selected from the group consisting of: a default communication preference and overruling alternative for said default communication preference, said communication preference is assigned by said means of prescribing to at least one selected from the group consisting of: said private interaction address of said first party, contained in said record; said manageable public interaction address of said first party, contained in said record or said reverse list, and said interaction address of said second party, contained in said reverse list.

36. The system for performing a controlled pre-interaction, as set forth in claim 27, further comprises at least one non-transitory computer storage memory configured to store therein a preset content for a notification, said preset content for said notification selected from the group consisting of: text, alphanumeric data, audio files, video files, graphics, hyperlinks and a template comprising at least one empty field, which is filled-in with content thereafter.

37. The system for performing a controlled pre-interaction, as set forth in claim 27, further comprises at least one non-transitory computer storage memory configured to store therein at least one default communication preference, wherein said default communication preference indicates said manageable public interaction address of said first party, determined by said means of determining during said pre-interaction act.

38. The system for performing a controlled pre-interaction, as set forth in claim 27, further comprises at least one non-transitory computer storage memory configured to store therein at least one default communication preference, wherein said default communication preference indicates said manageable public interaction address of said first party, determined by said means of determining during said pre-interaction act, and further comprises an overruling alternative for said default communication preference, wherein said overruling alternative indicates an alternative manageable public interaction address of said first party or said private interaction address of said first party for a particular communication session, if a predefined condition is met.

\* \* \* \* \*